| (12) | United States Patent<br>Hontz et al. | (10) Patent No.: US 9,789,949 B2<br>(45) Date of Patent: Oct. 17, 2017 |
|---|---|---|

(54) SOLAR WINDOW SHADE

(71) Applicant: B/E Aerospace, Inc., Wellington, FL (US)

(72) Inventors: Jeffrey W. Hontz, Winston-Salem, NC (US); Travis K. Finlay, Winston-Salem, NC (US); Alexander Nicholas Pozzi, Winston-Salem, NC (US)

(73) Assignee: B/E Aerospace, Inc., Wellington, FL (US)

( * ) Notice: Subject to any disclaimer, the term of this patent is extended or adjusted under 35 U.S.C. 154(b) by 170 days.

(21) Appl. No.: 14/936,863

(22) Filed: Nov. 10, 2015

(65) Prior Publication Data

US 2016/0137282 A1 May 19, 2016

Related U.S. Application Data

(60) Provisional application No. 62/079,643, filed on Nov. 14, 2014.

(51) Int. Cl.
| *H02J 7/00* | (2006.01) |
| *B64C 1/14* | (2006.01) |
| *B64D 47/00* | (2006.01) |
| *E06B 9/24* | (2006.01) |
| *H02J 7/02* | (2016.01) |
| *H02J 7/35* | (2006.01) |

(52) U.S. Cl.
CPC .............. *B64C 1/1484* (2013.01); *B64C 1/14* (2013.01); *B64D 47/00* (2013.01); *E06B 9/24* (2013.01); *H02J 7/025* (2013.01); *H02J 7/355* (2013.01); *E06B 2009/2476* (2013.01)

(58) Field of Classification Search
USPC ........................................................ 320/101
See application file for complete search history.

(56) References Cited

U.S. PATENT DOCUMENTS

| 7,210,545 B1 * | 5/2007 | Waid ................... B60K 7/0007<br>180/19.1 |
| 2011/0062779 A1 * | 3/2011 | Reichart ................ B60L 8/003<br>320/101 |
| 2014/0028242 A1 * | 1/2014 | Akin ........................ H02J 7/35<br>320/101 |

OTHER PUBLICATIONS

International Search Report and Written Opinion of corresponding International Application No. PCT/US2015/059835; dated Feb. 2, 2016; 10 pages.

* cited by examiner

*Primary Examiner* — Robert Grant
(74) *Attorney, Agent, or Firm* — Shumaker, Loop & Kendrick, LLP

(57) ABSTRACT

A solar window shade for a window seat in an airliner for supplying electrical energy to charge a personal electronic device, including a window shade configured to cover a window, a solar panel attached to an outside face of the window shade, the solar panel facing outward to receive light from outside a passenger cabin, and a charging port incorporated into the window shade, the charging port electrically connected to the solar panel.

14 Claims, 1 Drawing Sheet

SOLAR WINDOW SHADE

CROSS-REFERENCE TO RELATED APPLICATION

This application claims priority from U.S. Application No. 62/079,643 filed Nov. 14, 2014, the contents of which are incorporated by reference herein.

TECHNICAL FIELD AND BACKGROUND OF THE INVENTION

The present invention relates generally to a solar window shade adapted for use on airliners and other conveyances, and more particularly, to a window shade having an integrated solar panel arranged to receive light from outside the cabin, wherein power generated by the solar panel can be used to charge local electronic devices via a wired and/or wireless charging port located in the window shade.

Conventional window shades found on airliners and other passenger conveyances can take the form of roll-up, folding and slide-type assemblies. On airliners, such shades may be held in a frame assembly having a gradual curve from top to bottom to match the curvature of the aircraft fuselage and window, and are therefore constructed from a thin pliable sheet of material. In use, the window shade lowers to cover the underlying pressure proof window pane and rises to allow the passenger to see out the window.

Window shades may be manually operated or powered. Manually-operated window shades typically include a handle located along the bottom edge of the shade that facilitates gripping to physically manipulate the shade up and down. Automated window shades typically include controls located near the window or in an armrest or console positioned alongside the seat.

It has become commonplace on passenger type commercial aircraft to provide charging ports for charging carried-aboard personal electronic devices such as laptops, tablets, smartphones, media players, etc. Charging ports are typically located within the seat backs, consoles or armrests, and are powered via the electrical system of the aircraft. This arrangement requires long lengths of wiring and numerous interconnections, which add undesirable cost, weight and complexity to the interior construction.

Therefore, it would be desirable to eliminate reliance on the aircraft electrical system to charge passenger devices in at least some of the passenger seats. By providing a solar powered charging port at the window seats on an airliner, it is possible to substantially reduce the number of hard-wired connections needed to serve all passenger seats.

BRIEF SUMMARY OF THE INVENTION

It is therefore an object of the invention to equip an airliner or other passenger conveyance with means for charging personal electronic devices without relying on the electrical system of the conveyance.

It is another object of the invention to equip an airliner or other conveyance with a solar charging system for use by passengers and crew to charge carried-aboard personal electronic devices.

It is a further object of the invention to provide a solar window shade having an integrated solar panel and charging port for charging personal electronic devices in range of the charging port.

It is a further object of the invention to provide a solar window shade having an integrated solar panel arranged to face outward to receive light from outside the cabin, and an integrated charging port arranged to face inward for use in charging electronic devices via a wired and/or wireless connection.

It is a further object of the invention to provide a manual window shade having a handle for raising and lowering the shade, wherein a solar panel is incorporated into an outside face of the window shade and a charging port is incorporated into the handle.

To achieve the foregoing and other objects and advantages, in one embodiment the present invention provides a solar window shade adapted for use in an airliner passenger cabin including a window shade, a solar panel incorporated into the window shade, the solar panel arranged to face outward to receive light from outside the passenger cabin, and a charging port incorporated into the window shade, the charging port electrically connected to the solar panel and operable for charging an electronic device.

In a further aspect, the solar panel may be attached to an outside face of the window shade such that at least one solar cell of the solar panel faces outside the cabin.

In a further aspect, the window shade may be a thin pliable sheet of material and the solar panel may be adhered to the thin pliable sheet of material by way of lamination.

In a further aspect, the window shade may be selectively moveable between a position completely covering the window, a position in which the window is uncovered, and positions therebetween.

In a further aspect, the charging port may include at least one of a wired electrical connection and a wireless inductive charger.

In a further aspect, the solar window shade may include a battery incorporated into the window shade and electrically connected to the solar panel and the charging port, the battery operable for storing electrical energy generated by the solar panel.

In a further aspect, electrical wiring electrically connecting the solar panel and the charging port may be incorporated into the window shade.

In a further aspect, the window shade may include a handle arranged along a bottom edge thereof, and wherein the charging port may be located in the handle and face inward in a direction of the cabin.

In a further aspect, the charging port may include a wireless inductive charger and a wired charger collocated in the handle in a side-by-side arrangement.

In a further aspect, the solar window shade may include a battery located in the handle, the battery electrically connected to the solar panel and the charging port.

According to another embodiment, the present invention provides a solar window shade for a window seat for supplying electrical energy to charge a personal electronic device, including a window shade configured to cover a window, a solar panel attached to an outside face of the window shade, the solar panel facing outward to receive light from outside a passenger cabin, and a charging port incorporated into the window shade, the charging port electrically connected to the solar panel.

In a further aspect, the window shade may be a thin pliable sheet of opaque material and the solar panel nay be attached to the thin pliable sheet of opaque material by way of lamination.

In a further aspect, the charging port may include at least one of a wired electrical connection and a wireless inductive charger.

In a further aspect, the solar window shade may include a battery incorporated into the window shade and electrically connected to the solar panel and the charging port, the battery operable for storing electrical energy generated by the solar panel.

In a further aspect, electrical wiring electrically connecting the solar panel and the charging port may be incorporated into the window shade.

In a further aspect, the window shade may include a handle arranged along a bottom edge thereof, and wherein the charging port is located in the handle and faces inward in a direction of the cabin.

In a further aspect, the charging port may include a wireless inductive charger and a wired charger collocated in the handle in a side-by-side arrangement.

In a further aspect, the solar window shade may include a battery located in the handle, the battery electrically connected to the solar panel and the charging port.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
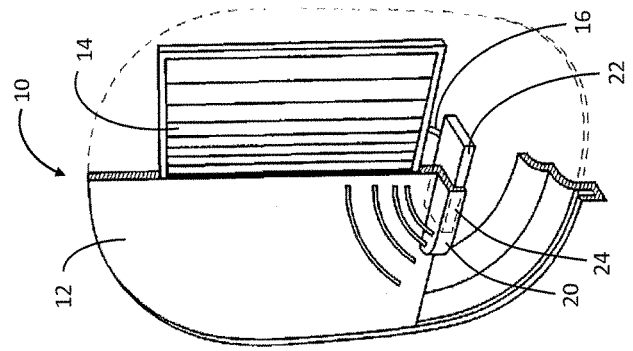
FIG. 1 shows a solar window shade according to a preferred embodiment of the invention.
Figure 2:
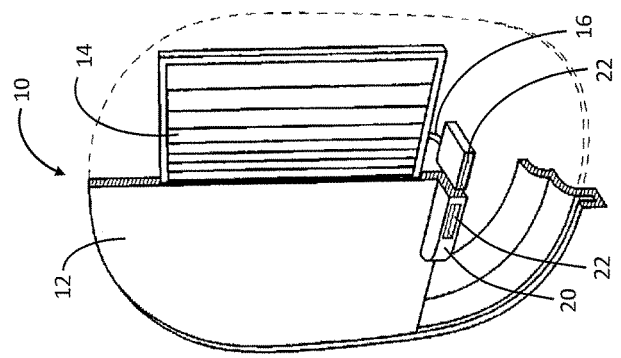
FIG. 2 is a cutaway view of the solar window shade showing the solar panel incorporated into the shade and charging port incorporated into the shade handle.
Figure 3:
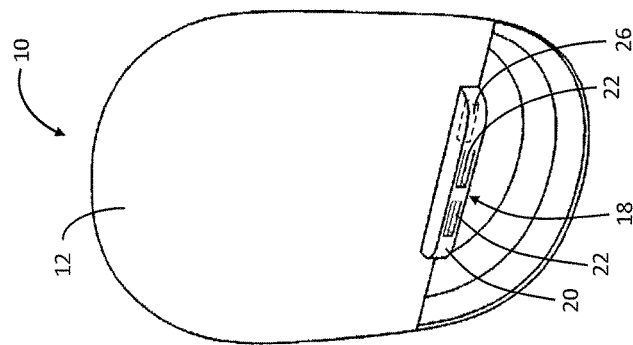
FIG. 3 is a cutaway view of the solar window shade showing operation of the wireless charging port located in the shade handle.

Referring to FIGS. 1-3, a preferred embodiment of a solar window shade adapted for us on passenger type commercial aircraft, airliners and other conveyances is shown generally at reference numeral 10. The solar window shade may take the form of a roll-up, folding, slide-type, etc., assembly. As shown, the solar window shade 10 is of the slide-type generally including a thin pliable shade 12 which is manually raised and lowered. It is envisioned that the shade 12 can be of other material types such as flexible, semi-rigid and rigid materials in which the shade is guided within a frame assembly. In embodiments utilizing glass solar panels, the shade may be rigid and of the slide-type. In embodiments utilizing non-glass solar panels, the shade may be a thin pliable sheet of opaque material, and may be of the roll-up or slide-type, among others.

The inner face of the window shade 12 faces in the direction of the cabin interior, while the outer face of the window shade 12 faces outside the cabin, and outside the aircraft. A solar panel 14 including at least one solar cell is integrated into, incorporated into or attached to the window shade 12. In a particular embodiment, the solar panel 14 attaches to the outer face of the window shade 12 such that the solar panel is arranged to receive light from outside the cabin and is hidden from view from within the cabin. For a rigid window shade, a portion of the outer face of the window shade may be recessed to receive the solar panel such that the incorporated or embedded solar panel sits flush with the non-recessed portion of the outer face of the window shade to provide a planar window shade. The solar panel 14 may also attach directly to the outer face of the window shade 12 in the case of a thin solar panel. In another embodiment, the window shade 12 and solar panel 14 may be adhesively bonded together to form a lamination, with the window shade serving as the underlying support layer and the lamination optionally including adhesive and protective cover layers.

Conducting wires 16 from the solar panel 14 terminate in a charging port 18 incorporated into the handle 20 of the window shade. In this arrangement, the handle size and shape can be customized to house any particular charging port connector type, and the connecting wires 16 can have a short finite length because the charging port 18 is fixed relative to the solar panel 14 as the window shade 12 is raised and lowered. In this arrangement, the charging port 18 is further positioned relative to the window seat occupant at about shoulder height for convenient use. Suitable wired connector types for the charging port 18 include, but are not limited to, universal serial bus (USB), 30-pin connector, 8-pin connector, etc.

The charging port 18 may include multiple wired charging ports 22 as shown in FIGS. 1 and 2, a wired charging port 22 and a wireless charging port 24 as shown in FIG. 3, or other combinations thereof. The charging ports 22, 24 may be collocated in the handle 20, for example, in a side-by-side arrangement as shown. The wireless charging port 24 may be an inductive charger which uses an electromagnetic field to transfer energy between the charger and the personal electronic device. The wireless charging port 24 may serve the window seat occupant as well as at least the seat or seats adjacent the window seat in all directions in range of the charging port 24. The charging port 18 may further house a battery 26 electrically connected to the solar panel 14 and charging ports 22, 24, the battery operable for storing electrical energy generated by the solar panel 14 and supplying that energy to power the charging ports 22, 24.

Photovoltaic cells suitable for use in the solar panel 14 can include mono-crystalline cells, multi-crystalline cells, amorphous silicon photovoltaic cells, compound semiconductor photovoltaic cells, etc. Preferred photovoltaic cells are of the multi-crystalline type due to cost and ability to sustain a longer period in which to generate electricity. Photovoltaic cell size may vary and module size may vary.

Glass solar panels may include a protective glass layer, solar cell and back sheet layer arranged and bonded together through multiple adhesive layers. While glass is rigid and impermeable to moisture, glass plates cannot be bent and are heavy and susceptible to fracture. Therefore, the solar panel 14 may utilize fluoropolymeric film as the covering material, such as Tefzel™, polyvinyl fluoride (PVF) and ethylene/tetrafluoroethylene (ETFE) coplymers which are lightweight, flexible and inexpensive. Another suitable copolymer film that functions as both an adhesive and a sealant is ethylene vinyl acetate (EVA), which can be cured and hardened after being heated to a high temperature. Other polylefin type resins include ethylene-methyl acrylate copolymer (EMA), ethylene-ethyl acrylate copolymer (EEA), and butyral resin, urethane resin, silicone, and the like. The solar panel 14 may further include a solar cell back protection layer, such as polyvinylidene fluoride film (PVF) polymer film, and a reinforcing sheet such as aluminum, fiberglass-reinforced plastic (FRP), and the like.

In a further embodiment, each solar panel 14 may be a stacked arrangement including a non-glass cover layer for protecting the photovoltaic module from environmental impact, a photovoltaic layer underlying the cover layer and including at least one photovoltaic cell for producing an electrical current, a back protection sheet layer underlying the photovoltaic layer for preventing leakage of electrical current, a support layer (e.g., window shade itself) underlying the back protection sheet layer for imparting rigidity to the photovoltaic module, and adhesive layers between the various other layers, with the plurality of layers bonded together to form a lamination.

As shown throughout the figures, the window shade 10 is a manually-operated shade in which the handle 20 is grabbed to manually raise and lower the shade 12. The handle 20, and therefore the charging ports 22, 24, is accessible in each of the fully lowered, partially raised and fully raised positions of the window shade 12. Incorporating the charging ports 22, 24 into the handle 20 allows access to the charging ports regardless of the position of the window shade. In automated shades which lack a handle, the charging ports 22, 24 may be incorporated into the shade 12 itself or frame assembly surrounding the shade.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A solar window shade adapted for use in an airliner passenger cabin, comprising:
   a window shade;
   a solar panel incorporated into the window shade, the solar panel arranged to face outward to receive light from outside the passenger cabin;
   a charging port incorporated into the window shade, the charging port electrically connected to the solar panel and operable for charging an electronic device, the window shade comprising a handle arranged along a bottom edge thereof and the charging port located in the handle facing inward in a direction of the passenger cabin; and
   a battery located in the handle, the battery electrically connected to the solar panel and the charging port.

2. The solar window shade of claim 1, wherein the solar panel is attached to an outside face of the window shade such that at least one solar cell of the solar panel faces outside the cabin.

3. The solar window shade of claim 1, wherein the window shade is a thin pliable sheet of material and the solar panel is adhered to the thin pliable sheet of material by way of lamination.

4. The solar window shade of claim 1, wherein the window shade is selectively moveable between a position completely covering the window, a position in which the window is uncovered, and positions therebetween.

5. The solar window shade of claim 1, wherein the charging port comprises at least one of a wired electrical connection and a wireless inductive charger.

6. The solar window shade of claim 1, further comprising a battery incorporated into the window shade and electrically connected to the solar panel and the charging port, the battery operable for storing electrical energy generated by the solar panel.

7. The solar window shade of claim 1, wherein electrical wiring electrically connecting the solar panel and the charging port is incorporated into the window shade.

8. The solar window shade of claim 1, wherein the charging port includes a wireless inductive charger and a wired charger collocated in the handle in a side-by-side arrangement.

9. A solar window shade for a window seat for supplying electrical energy to charge a personal electronic device, comprising:
   a window shade configured to cover a window;
   a solar panel attached to an outside face of the window shade, the solar panel facing outward to receive light from outside a passenger cabin; and
   a charging port incorporated into the window shade, the charging port electrically connected to the solar panel, wherein the window shade comprises a handle arranged along a bottom edge thereof and the charging port is located in the handles and faces inward in a direction of the passenger cabin, and wherein the charging port includes a wireless inductive charger and a wired charger collocated in the handle in a side-by-side arrangement.

10. The solar window shade of claim 9, wherein the window shade is a thin pliable sheet of opaque material and the solar panel is attached to the thin pliable sheet of opaque material by way of lamination.

11. The solar window shade of claim 9, wherein the charging port comprises at least one of a wired electrical connection and a wireless inductive charger.

12. The solar window shade of claim 9, further comprising a battery incorporated into the window shade and electrically connected to the solar panel and the charging port, the battery operable for storing electrical energy generated by the solar panel.

13. The solar window shade of claim 9, wherein electrical wiring electrically connecting the solar panel and the charging port is incorporated into the window shade.

14. The solar window shade of claim 9, further comprising a battery located in the handle, the battery electrically connected to the solar panel and the charging port.

* * * * *